United States Patent [19]

Flesher

[11] Patent Number: 5,506,024
[45] Date of Patent: Apr. 9, 1996

[54] POLYETHERESTERAMIDE-BASED WATER VAPOR PERMEABLE THERMOPLASTIC ELASTOMER FILM, PROCESS FOR ITS MANUFACTURE AND ARTICLES COMPRISING SAID FILM

[75] Inventor: Joseph R. Flesher, Colchester, Vt.

[73] Assignee: Atochem, Paris la Defense, France

[21] Appl. No.: 479,538

[22] Filed: Jun. 7, 1995

Related U.S. Application Data

[63] Continuation of Ser. No. 202,633, Feb. 28, 1994, abandoned, which is a continuation of Ser. No. 18,198, Feb. 16, 1993, abandoned, which is a continuation of Ser. No. 441,072, Nov. 22, 1989, abandoned.

[30] Foreign Application Priority Data

Nov. 25, 1988 [FR] France .................................. 88 15441

[51] Int. Cl.⁶ .................................................. C08G 69/40
[52] U.S. Cl. ............................... 428/85; 428/96; 428/252; 428/315.5; 428/315.9; 428/317.1; 428/474.4; 428/474.9; 428/913; 525/408; 525/423; 525/430; 525/926; 528/292
[58] Field of Search .................................. 428/252, 315.5, 428/315.9, 317.1, 474.4, 474.9, 913, 85, 96; 525/408, 423, 430, 526; 528/292

[56] References Cited

U.S. PATENT DOCUMENTS

| | | | |
|---|---|---|---|
| 3,455,734 | 7/1969 | Jones et al. | 427/389 |
| 3,636,135 | 1/1972 | Garforth | 525/434 |
| 4,230,838 | 10/1980 | Foy et al. | 525/408 |
| 4,536,563 | 8/1985 | Okitsu et al. | 528/279 |
| 4,689,393 | 8/1987 | Liedloff | 528/283 |
| 4,808,675 | 2/1989 | Twilley et al. | 525/408 |
| 4,839,441 | 6/1989 | Cazin et al. | 528/328 |
| 4,873,292 | 10/1989 | Ogata et al. | 525/408 |

OTHER PUBLICATIONS

Chemical Abstracts 118:170912, "Polyamide–Polyester––Polyethers as Hot–Melt Adhesives", Knipf et al.
Chemical Abstracts 107:64930, "Bandage for Wound Dressing".

*Primary Examiner*—Frederick Krass
*Attorney, Agent, or Firm*—Burns, Doane, Swecker & Mathis

[57] ABSTRACT

Water vapor permeable films of polymeric material of thermoplastic elastomer type based on polyetheresteramide, and preferably on polyether block amides and articles comprising a film of this kind and capable, in particular, of coming into contact with the human body.

18 Claims, No Drawings

POLYETHERESTERAMIDE-BASED WATER VAPOR PERMEABLE THERMOPLASTIC ELASTOMER FILM, PROCESS FOR ITS MANUFACTURE AND ARTICLES COMPRISING SAID FILM

This application is a continuation of application Ser. No. 08/202,633, filed Feb. 28, 1994 now abandoned, which is a continuation of application Ser. No. 08/018, 198, filed Feb. 16, 1993 now abandoned, which is a continuation of application Ser. No. 07/441,072, filed on Nov. 22, 1989 now abandoned.

BACKGROUND OF THE INVENTION

The present invention relates to film of thermoplastic elastomer type, permeable to water vapor and to many gases.

In all the that followed, the term "film" is used according to the definition of it given in the Modern Plastics Encyclopedia; i.e., a planar section whose thickness is very low in comparison to its length and width.

It is considered that the thickness of a film is generally below 250µm.

In European Patent published under No. 46,071 there is the description of a water vapor permeable film consisting of a mixture of polyurethane and of a polymer incompatible with the polyurethane, such as polystyrene.

In European Patent Published under No. 141,592 a water vapor permeable film is proposed, consisting of a mixture of incompatible polymers based on ethylene/vinyl acetate copolymer and on vinyl polymer.

In European Patent published under No. 52,915 there is a description of a polyurethane film which is nonporous and permeable to gases.

Now, the permeability of these films to gases and in particular to water vapor is not very satisfactory, this being especially so in the case of films of low, or even of very low thickness.

SUMMARY OF THE INVENTION

The film developed of the instant invention exhibits, an equal thickness, a water vapor permeability which is improved in relation to the films mentioned above and its properties remain highly satisfactory in the case of low thicknesses.

The film in accordance with the invention is made of polyetheresteramide-based polymeric material of thermoplastic elastomer type as hereinafter set forth. The invention also comprises the method of making such film and products utilizing such film as hereinafter set forth.

DETAILED DESCRIPTION

The term "polyetheresteramides" as used herein is intended to mean both random polyetheresteramides (that is those formed by random chain sequencing of various monomeric constitutents) and block polyetheresteramides (that is to say those made up of blocks exhibiting a certain chain length of the various constituents).

The polyetheresteramides are the product of the copolycondensation of polyamide blocks with reactive ends with polyether blocks with reactive ends, such as, among others, polyamide blocks with dicarboxylic chain ends with polyetherdiol blocks.

Such products have been described, for example, in French Patents No. 74/18,913 and 77/26,678, whose description is incorporated herein by reference and in Patent Applications EP 25,288, J 60-063,225 and J 63-301,223.

The number-average molecular mass of these polyamide blocks is generally between 500 and 10,000 and more particularly between 600 and 5,000. The polyamide blocks of polyetheresteramides are preferably made up of polyamide 6, 6.6, 6.12, 11, 12 or 12.12 (PA-6, PA-6.6, PA-6.12, PA-11, PA-12, PA-12.12) or of copolyamides resulting from the polycondensation of their monomers.

The number-average molecular mass of the polyethers is generally between 200 and 6,000 and more particularly between 600 and 3,000.

The polyether blocks preferably consist of polytetramethylene glycol (PTMG) polypropylene glycol (PPG) or polyethylene glycol (PEG), homo- or copolymerized.

The inherent viscosity of the polyetheresteramides is advantageously between 0.8 and 2.05.

The inherent viscosity is measured in meta-cresol at 20° C. with an initial concentration of 0.5 g per 100 g of meta-cresol. It is expressed in $dlg^{-1}$.

The polyetheresteramides according to the invention may be made up of 5 to 85 % by weight of polyether and of 95 to 15% by weight of polyamide, and preferably of 20 to 85% by weight of polyether and 80 to 15% by weight of polyamide.

Among the polyetheresteramides which are suitable for the invention, it has been noted that some were particularly permeable to water vapor. These are polyether block amides in which polyether blocks contain homo- or copolymerized PEG and preferably those in which the polyamide blocks are derived from PA-12, PA-11, PA-12.12, homo- or copolymerized, such as for example co-PA-6/12.

The mixture of polymeric material which forms the polyetheresteramide-based film according to the invention may optionally contain organic or inorganic fillers.

The mixture may also contain various additives such as anti-UV agents, demolding agents, impact modifiers, and the like conventionally used in films, and also colorants or pigments.

The fillers and other additives are used in their usual amounts and for their usual purposes and up to 60 % of the total weight of the film of various fillers and/or additives can be added.

The films in accordance with the invention which are particularly preferred are those whose moisture gain (measured by immersing in water a test specimen 1.6×40×170 mm in size at 23° C. for 24 hours) is less than 120% of the initial weight of the test specimen before immersion, preferably less than 110% and advantageously less than 50%.

The conversion of the mixture described above into film can be carried out according to any known extrusion process, such as extrusion flat calendering, extrusion coating, and blow extrusion. The said mixture may be treated in the molten state in a single- or twin-screw extruder.

In general, the extrusion temperature is between 190°and 220° C., and preferably between 200 and 210° C.

As described above, the films have a thickness of below 250µm.

The thickness of the films in accordance with the invention may be advantageously between 8 and 150 µm and preferably between 8 and 100 µm and, better, between 8 and 60 µm.

The polyetheresteramide-based films in accordance with the invention exhibit good mechanical, physical and chemical properties.

Among the properties offered by the films according to the invention there may be mentioned, in particular:

(i) flexibility and impact strength at low temperature,
(ii) good dynamic properties,
(iii) easy processability,
(iv) good acceptability of various fillers and additives, and
(v) permeability to water vapor and to many gases.

The films of low thickness (below 60 μm) exhibit not only good water vapor permeability properties, but also good physical and chemical properties, and especially mechanical properties.

They are particularly preferred within the scope of the present invention, because they permit a significant saving in material in comparison with other films, for example those based on polyurethane which, at equal permeability, are thicker.

All the properties listed above make it possible to employ polyetheresteramide-based films in accordance with the invention in many application and especially for composite articles and objects provided with such film(s) and intended for contact with the human or animal body.

The films according to the invention are advantageously employed in the manufacture of clothing and/or footwear, especially those intended for sports and leisure activities.

The films may be bonded to substrates such as fabric, leather, plastic, etc., for example by heating, or with the aid of an appropriate bonding agent. The films thus bonded can be placed either inside the garment or the shoe, or outside.

It is also possible to insert the films in accordance with the invention between layers of materials which are identical or otherwise; in this case, the films may remain free or may be bonded, as indicated above, to one or more of the materials.

The films in accordance with the invention are advantageously suitable for medical usages.

They are particularly suitable for the development of adhesive or nonadhesive dressings, or compresses, etc., and also for the linen employed in operating units.

These films can also be involved in the manufacture of hardware supports for curative or preventive medications administered subcutaneously. In this case, the active substances may be incorporated in the film when it is processed.

The films according to the invention are advantageously employed for the manufacture of seats and more particularly of motor vehicle seats.

During the manufacture of a motor vehicle seat it is possible, for example, to lay the surface fabric or coating against the mold and then to cover it with a film according to the invention before filling the interior of the mold with foam, which has the effect of flattening the said film well against the surface fabric or coating.

The films in accordance with the invention may also be employed advantageously in the building field.

It is possible, for example, to place such films under roofing materials and over the whole surface of the roof in order to permit the removal of moisture from the building and to increase the leakproofing of roof, without, however, the said moisture being retained by the film.

The invention will be further described in connection with the following examples which are set forth for purposes of illustration only.

EXAMPLE 1

A. Granules of polyetheresteramide are introduced into an extruder.

The whole is heated to a temperature of between 190° an 220° C.

At the die exit, a polyetheresteramide-based film with a thickness equal to approximately 55 μm is obtained.

The polyetheresteramide employed is obtained by copolycondensation of α,ω-dicarboxylated polyamide 12 (PA-12) blocks of $\overline{M}n$ =600 with α,ω-dihydroxylated polytetramethylene glycol (PTMG) blocks of $\overline{M}n$ =2,000.

The polyetheresteramide consists of 23% by weight of PA-12 blocks and 77% by weight of PTMG blocks.

The water vapor permeability of the film described above is tested at 22° C. ±2° C. and at 38° C. ±1° C. according to the following test, developed by the assignee of the instant application.

The disc of a diameter below or equal to 10 cm is cut from the film thus obtained and its surface area, S, is calculated.

The disc is then placed on an adjustable support inside a leakproof enclosure whose moisture content is kept constant (100% relative humidity) and the temperature θ is kept constant with θ=22° C. ±2° C. and θ=38° C. ±1° C.

One face of the disc is left in contact with the moist atmosphere of the enclosure, while the other is swept by a dry nitrogen stream at a constant rate equal to approximately 110 ml/min.

The water vapor diffuses through thickness, e, of the disc and is then entrained by the nitrogen stream when it reaches the face of the disc which is swept by the nitrogen stream.

When the quantity of entrained water vapor has stabilized (in general after a few hours) the nitrogen flow is connected to a coulometer in order to measure the quantity of water, q, entrained during a specified time, t, (in general between 10 secs. and 10 min.).

5 to 6 measurements are carried out for each test and the mean value of the permeability p, p' to water vapor is calculated for a temperature θ and a degree of humidity, which are given:

$$p = \frac{q \times 24 \times 60}{t \times S} \text{ (expressed in g/m}^2 \cdot 24\text{ h)}$$

$$p' = \frac{q \times 24 \times 60 \times e}{t \times s} = p \times e \text{ (expressed in g. mm/m}^2 \cdot 24\text{ h)}$$

The results are collated in Table I below. The water vapor permeability of the said film is also measured according to NF standard G 52-019 (expressed in g/m²/24 h), as is the evaporative resistance $R_{et}$ in accordance with DIN standard 54-101 Teil 1 (expressed in m².mbar/W×10³).

The results are collated in Table II below.

B. By way of comparison, the water vapor permeability is measured of a polyester-based polyurethane film with a thickness of approximately 53 μm under the same conditions as in A.

The relative density of the polyurethane is equal to 1.19, its Shore A hardness, measured according to ASTM standard D 2240 is equal to 86, and its melting range is between 200° and 230° C. The results are recorded in Table I.

C. By way of comparison, the water vapor permeability of a polyether-based polyurethane film with a thickness of approximately 51μm is measured under the same conditions as in A.

The relative density of the polyurethane is equal to 1.12, its Shore A hardness, measured according to ASTM standard D 2240 is equal to 85 and its melting range is between 190° and 220° C.

The results are listed in Table I.

D. A film of the same composition as in A, with a thickness equal to approximately 30 μm is produced under the same conditions as described in A.

The water vapor permeability and the evaporative resistance of this film are measured under the same conditions as in A.

The results are collated in Table II.

EXAMPLE 2

A. A polyetheresteramide-based film with a thickness of approximately 75 82 m is produced under the same operating conditions as those described in Example 1.

The polyetheresteramide is obtained by copolycondensation of α,ω-dihydroxylated PA-12 blocks of $\overline{M}n$ =2,000 with α,ω-dihydroxylated PTMG blocks of $\overline{M}n$ =2,000.

The polyetheresteramide consists of 50% by weight of PA-12 and of 50% by weight of PTMG.

The water vapor permeability of the film described above is tested at 22°±2° C. and at 38°±1° C. in the same way as in Example 1.

The results are expressed in g. mm/m². 24 h and in g/m². 24 h and are collated in Table I.

B. A film of the same composition as in A, but with a thickness of approximately 107 μm is produced under the same conditions as those described in A. The water vapor permeability of this film is measured under the same conditions as described under A.

The results are collated in Table I.

C. A film of the same composition as in A, but with a thickness of approximately 185 μm is produced under the same conditions as described under A. The water vapor permeability of this film is measured under the same conditions as in A.

The results are collated in Table I.

D. A film of the same compositions, but with a thickness of approximately 12 μm is produced under the same conditions as described under A.

The water vapor permeability and the evaporative resistance of this film are measured under the same conditions as under A.

The results are collated in Table II.

E. A film of the same, composition, but with a thickness of approximately 18 μm is produced under the same conditions as described under A.

The water vapor permeability and the evaporative resistance of this film are measured under the same conditions as under A.

The results are collated in Table II.

EXAMPLE 3

A polyetheresteramide-based film with a thickness of approximately 30 μm is produced under the same operating conditions as those described in Example 1.

The polyetheresteramide employed is obtained by copolycondensation of α,ω-dicarboxylated PA-12 blocks of $\overline{M}n$ =850 with α,ω-dihydroxylated PTMG blocks of $\overline{M}n$ =2,000.

The polyetheresteramide is composed of 30% by weight of polyamide blocks and of 70% by weight of polyether blocks.

The water vapor permeability of the said film and its evaporative resistance are measured in accordance with the standards described in Example 1.A.

The results are collated in Table III.

B. A film of the same composition as in A, but whose thickness is approximately 50 μm is produced under the same conditions as in A.

The water vapor permeability of the above film and its evaporative resistance are measured under the same conditions as those described under A.

The results are collated in Table II.

EXAMPLE 4

A polyetheresteramide-based film with a thickness of 12 μm is produced under the same operating conditions as those described in Example 1.

The polyetheresteramide employed is obtained by copolycondensation of α,ω-dicarboxylated PA-12blocks of $\overline{M}n$ =2,000, with α,ω-dihydroxylated PTMG blocks of $\overline{M}n$ =1,000.

The polyetheresteramide is composed of 67% by weight of polyamide blocks and of 33% by weight of polyether blocks.

The water vapor permeability of the said film and its evaporative resistance are measured in accordance with the standards described in Example 1.A.

The results are collated in Table II.

B. A film of the same composition as in A, but with a thickness equal to approximately 18 μm is produced under the same conditions as described under A.

The water vapor permeability of this film and its evaporative resistance are measured under the same conditions under A.

The results are collated in Table II.

EXAMPLE 5

A polyetheresteramide-based film with a thickness of 12 μm is produced under the same operating conditions as those described in Example 1.

The polyetheresteramide employed is obtained by copolycondensation of α,ω-dicarboxylated PA-12 blocks of $\overline{M}n$ =4,000, with α,ω-dihydroxylated PTMG blocks of $\overline{M}n$ =1,000.

The polyetheresteramide is composed of 80% by weight of polyamide blocks and of 20% by weight of polyether blocks.

The water vapor permeability of the said film and its evaporative resistance are measured in accordance with the standards described in Example 1.A.

The results are collated in Table II.

B. A film of the same composition as in A, but with a thickness equal to approximately 18 μm is produced under the same conditions as described under A.

The water vapor permeability of the above film and its evaporative resistance are measured under the same conditions under A.

The results are collated in Table II.

C. A film of the same composition, but with a thickness of approximately 30 μm is produced under the same conditions as described under A.

The water vapor permeability and the evaporative resistance of this film are measured under the same conditions under A.

The results are collated in Table II.

EXAMPLE 6

A polyetheresteramide-based film with a thickness of 12 μm is produced under the same operating conditions as those described in Example 1.

The polyetheresteramide employed is obtained by copolycondensation of α,ω-dicarboxylated PA-12 blocks of $\overline{Mn}$ =5,000, with α,ω-dihydroxylated PTMG blocks of $\overline{Mn}$ =650. The polyetheresteramide is composed of 88% by weight of polyamide blocks and of 12% by weight of polyether blocks.

The water vapor permeability and the evaporative resistance of the film are measured in the same way and in accordance with the standards described in Example 1.A.

The results are collated in Table II.

B. A film of the same condition, but with a thickness of approximately 18 μm is produced under the same conditions as described under A.

The water vapor permeability and the evaporative resistance of this film are measured under the same conditions as under A.

The results are collated in Table II.

C. A film of the same composition, but with a thickness of approximately 30 μm is produced under the same conditions as described under A.

The water vapor permeability and the evaporative resistance of this film are measured under the same conditions as under A.

The results are collated in Table II.

EXAMPLE 7

A polyetheresteramide-based film with a thickness of approximately 70 μm is produced under the same operating conditions as those described in Example 1.

The polyetheresteramide employed is obtained by copolycondensation of α,ω-dicarboxylated PA-12 blocks of $\overline{Mn}$ =650 with α,ω-dihydroxylated PTMG blocks of $\overline{Mn}$ =1,500.

The polyetheresteramide is composed of 30% by weight of polyamide blocks and of 70% by weight of polyether blocks.

The water vapor permeability of the film described above is measured according to the test developed by the assignee as described in Example 1.A.

The results are collated in Table I.

EXAMPLE 8

A polyetheresteramide-based film with a thickness of approximately 78 μm is produced under the same operating conditions as those described in Example 1.

The polyetheresteramide employed is obtained by copolycondensation of α,ω-dicarboxylated PA-12 blocks of $\overline{Mn}$ =1,500 with α,ω-dihydroxylated PEG blocks of $\overline{Mn}$ =1,500.

The polyetheresteramide is composed of 50% by weight of polyamide blocks and of 50% by weight of polyether blocks.

The water vapor permeability of the film is measured according to the test developed by the assignee as described in Example 1.A.

The results are collated in Table I.

B. A film of the same composition as in A, but whose thickness is approximately 18 μm is produced under the same conditions as in A.

The water vapor permeability and the evaporative resistance of the above film are measured in accordance with the standards described in Example 1.A.

The results are collated in Table II.

C. A film of the same composition as in A, but whose thickness is approximately 50 μm is produced under the same conditions as in A.

Its permeability and its evaporative resistance are measured under the same conditions as in B.

The results are collated in Table II.

D. A film of the same composition as in A, but whose thickness is approximately 100 μm is produced under the same conditions as in A.

Its permeability and its evaporative resistance are measured under the same conditions as in B.

The results are collated in Table II.

EXAMPLE 9

A polyetheresteramide-based film with a thickness of approximately 100 μm is produced under the same operating conditions as those described in Example 1.

The polyetheresteramide employed is obtained by copolycondensation of αω-dicarboxylated PA-12 blocks of $\overline{Mn}$ =4,500, with(α,ω-dihydroxylated PEG blocks of $\overline{Mn}$ =1,500.

The polyetheresteramide is composed of 75% by weight of polyamide blocks and of 25% by weight of polyether blocks.

The water vapor permeability of the film is measured according to the test developed by the assignee and described in Example 1.A. The results are collated in Table I.

B. A film of the same composition as in A, but whose thickness is approximately 18 μm is produced under the same conditions as in A.

The water vapor permeability and the evaporative resistance of the above film are measured according to the standards described in Example 1.A.

The results are collated in Table II.

C. A film of the same composition as in A, but whose thickness is approximately 50 μm is produced under the same conditions as in A.

Its permeability and its evaporative resistance are measured under the same conditions as in B.

The results are collated in Table II.

D. By way of comparison, a polyester-based polyurethane film with a thickness of approximately 100 μm is employed, its water vapor permeability being measured under the same conditions as described in A.

The relative density of the polyurethane is 1.19, its Shore A hardness measured according to ASTM standard D 2240 is 86, and its melting range is between 200° and 230° C.

The results are collated in Table I.

E. By way of comparison the water vapor permeability of a polyether-based polyurethane film with a thickness of approximately 104 μm is measured under the same conditions as described in A.

The relative density of the polyurethane employed is 1.12, its Shore A hardness, measured according to ASTM standard D 2400, is 85 and its melting range is between 190° and 220° C.

The results are collated in Table I.

EXAMPLE 10

A polyetheresteramide-based film is produced under the same operating conditions as described in Example 1, with a thickness of approximately 18 μm.

The polyetheresteramide employed is obtained by copolycondensation of coPA 6/12 blocks and of PPG/PTMG copolyether blocks.

The coPA 6/12 of $\overline{M}n = 1,300$ consists of 50% by weight of PA-6 and of 50% by weight of PA-12.

The copolyether consists of 80% by weight of PPG of $\overline{M}n = 600$ and of 20% by weight of PTMG of $\overline{M}n = 650$.

The polyetheresteramide is composed of 66% by weight of copolyamide blocks and of 34% by weight of copolyether blocks.

The water vapor permeability and the evaporative resistance of the film are measured according to the standards defined in Example 1.A.

The results are collated in Table II.

B. A film of the same composition as in A, but whose thickness is approximately 30 μm is produced under the same conditions as in A.

Its permeability and its evaporative resistance are measured under the same conditions as in A.

The results are collated in Table II.

Measurement of the moisture gain

Test specimens of various polyetheresteramides, 1.6 ×40 ×170 mm in size, are produced and their moisture regain is tested after 24 hours' immersion in water at 23° C.

The moisture gain of test specimens 50 ×50 ×4 mm in size is also tested after 15 days at 23° C. at 50% relative humidity (RH).

The results are collated in Table II and are expressed as percentages by weight relative to the initial weight of the sample.

TABLE II

| EX No. | THICKNESS (m) | $R_{et} \times 10^3$ $m^2 \cdot mbar/W$ | PERMEABILITY TO WATER VAPOR $g/m^2/25$ hour |
|---|---|---|---|
| 1.A | 55 | 554 | 1310 * |
| 1.D | 30 | 240 | 2510 * |
| 2.D | 12 | 458 | 1430 * |
| 2.E | 18 | 608 | 1280 * |
| 3.A | 30 | 453 | 1890 * |
| 3.B | 50 | 758 | 940 * |
| 4.A | 12 | 580 | 1180 * |
| 4.B | 18 | 845 | 830 * |
| 5.A | 12 | 1061 | 610 * |
| 5.B | 18 | 1901 | 310 * |
| 5.C | 30 | 1412 | 580 * |
| 6.A | 12 | 2803 | 220 * |
| 6.B | 18 | 2804 | 270 * |
| 6.C | 30 | 3793 | 1560 * |
| 8.B | 18 | 65 | 5350 |
| 8.C | 50 | 89 | 4880 |
| 8.D | 100 | 172 | 4180 |
| 9.B | 18 | 113 | 3630 |
| 9.C | 50 | 315 | 2550 |
| 10.A | 18 | 644 | 1000 |
| 10.B | 30 | 796 | 810 |

*Much condensation on the surface of the test specimen.

TABLE III

| Polyetheresteramide type | MOISTURE GAIN (%) | |
|---|---|---|
| | 24 h/water at 23° C. | 15 days at 23° C. 50% RH |
| EX 1 | 1.25 | |
| EX 2 | 1.12 | |
| EX 3 | 1.25 | |
| EX 4 | 0.93 | |
| EX 5 | 0.51 | |
| EX 6 | 0.33 | |

TABLE I

| EX | FILM THICKNESS (m) | FILM COMPOSITION | PERMEABILITY TO WATER VAPOR | | | |
|---|---|---|---|---|---|---|
| | | | at 22 ± 2° C. | | at 38 ± 1° C. | |
| | | | g.mm/m² .24 h | g/m² .24 h | g.mm/m² .24 h | g/m² .24 h |
| 1.A | 55 | Polyetheresteramide | 11.5 | 209 | a | a |
| 1.B (COMP.) | 53 | Polyester-based polyurethane | 8.5 | 160 | 20 | 408 |
| 1.C (COMP.) | 51 | Polyether-based polyurethane | 8 | 157 | 22 | 426 |
| 2.A | 75 | Polyetheresteramide | 14 | 187 | 46 | 613 |
| 2.B | 107 | Polyetheresteramide | 14 | 131 | 50 | 463 |
| 2.C | 185 | Polyetheresteramide | 16.5 | 89 | 59 | 322 |
| 7 | 70 | Polyetheresteramide | 20 | 286 | a | a |
| 8.A | 78 | Polyetheresteramide | 19.2 | 246 | a | a |
| 9.A | 100 | Polyetheresteramide | 11.9 | 119 | 51 | 537 |
| 9.D (COMP.) | 100 | Polyester-based polyurethane | 10 | 100 | 26 | 255 |
| 9.E (COMP.) | 104 | Polyether-based polyurethane | 9.5 | 91 | 25 | 263 | a = too permeable (condensation on the apparatus)

TABLE III-continued

| Polyetherester-amide type | MOISTURE GAIN (%) | |
|---|---|---|
| | 24 h/water at 23° C. | 15 days at 23° C. 50% RH |
| EX 7 | 109 | 1.8 |
| EX 8 | 48 | 1.4 |
| EX 9 | 12 | 0.9 |
| EX 10 | 3.5 | 1.3 |
| X | 120 | 4.5 |

The polyetheresteramide X consists of 50% by weight of PA-6 blocks of Mn = 1,500 and 50% by weight of PEG blocks of $\overline{\text{Mn}}$ = 1,500.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as definde by the appended claims.

What is claimed is:

1. A composite article comprising a substrate having a gas and water vapor-permeable thin thermoplastic elastomer film adherently bonded thereto, said thin thermoplastic elastomer film having a thickness of less than about 250 μm, a moisture gain of less than 120% of its initial weight after immersion in water at 23° C. for 24 hours and consisting essentially of a polyetheresteramide comprising polyamide blocks having a number-average molecular weight ranging from 500 to 10,000 and polyether blocks having a number-average molecular weight ranging from 200 to 6,000.

2. The composite article as defined by claim 1, comprising an article of clothing.

3. The composite article as defined by claim 1, comprising an article of footwear.

4. The composite article as defined by claim 1, comprising a medical dressing or compress.

5. The composite article as defined by claim 1, said substrate comprising a textile fabric.

6. The composite article as defined by claim 1, said substrate comprising leather.

7. The composite article as defined by claim 1, said substrate comprising a plastic.

8. The composite article as defined by claim 1, comprising a hardware support for a subcutaneous medication-administering device.

9. The composite article as defined by claim 1, comprising a motor vehicle seat.

10. The composite article as defined by claim 1, comprising a roofing material.

11. The composite article as defined by claim 1, said thin thermoplastic elastomer film consisting of a block polyetheresteramide.

12. The composite article as defined by claim 1, said thin thermoplastic elastomer film having a moisture gain of less than 110% of its initial weight after immersion in water at 23° C. for 24 hours.

13. The composite article as defined by claim 12, said moisture gain being less than 50%.

14. The composite article as defined by claim 1, said thin thermoplastic elastomer film having a thickness of from 8 to 150 μm.

15. The thin composite article as defined by claim 1, said polyetheresteramide comprising a (co)polyamide 6, 6/6, 6/12, 11, 12 or 12/12 block polyetheresteramide.

16. The composite article as defined by claim 1, said polyetheresteramide comprising polyether blocks containing homo- or copolymerized polyethylene glycol.

17. The composite article according to claim 16 wherein the polyamide blocks comprise homo- or copolymers of polyamide 11, 12, or 12/12.

18. The composite article as defined by claim 1 said polyetheresteramide having polyamide blocks with carboxylic chain ends bonded to polyetherdiols by ester bonds.

* * * * *